United States Patent
Chappex

(10) Patent No.: US 9,254,742 B2
(45) Date of Patent: Feb. 9, 2016

(54) GRILLE SHUTTER

(71) Applicant: Johnson Electric S.A., Murten (CH)

(72) Inventor: Yan Chappex, Carrouge (CH)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 14/504,266

(22) Filed: Oct. 1, 2014

(65) Prior Publication Data

US 2015/0090508 A1    Apr. 2, 2015

(30) Foreign Application Priority Data

Oct. 1, 2013 (GB) .................................. 1317328.1

(51) Int. Cl.
*B60K 11/08* (2006.01)
*F01P 7/10* (2006.01)

(52) U.S. Cl.
CPC *B60K 11/085* (2013.01); *F01P 7/10* (2013.01)

(58) Field of Classification Search
CPC ................. B60K 11/085; B60K 11/04; Y10T 74/19828; Y10T 74/2063; Y10T 74/18792; F16H 25/2015; E05F 11/34
IPC .................................................... B60K 11/085
See application file for complete search history.

(56) References Cited

U.S. PATENT DOCUMENTS

| | | | |
|---|---|---|---|
| 3,398,590 A * | 8/1968 | Campbell ............... E05F 11/34 74/425 |
| 3,490,307 A * | 1/1970 | Jetter .............................. 74/425 |
| 5,182,957 A | 2/1993 | Bohmer et al. |
| 5,449,143 A | 9/1995 | Hur |
| 5,680,728 A | 10/1997 | Moy |
| 8,720,624 B2 * | 5/2014 | Remy et al. .................... 180/68.1 |
| 8,827,233 B2 * | 9/2014 | Crane ..................... F24F 13/20 248/200 |
| 2010/0243352 A1 * | 9/2010 | Watanabe et al. ............. 180/68.1 |
| 2011/0048691 A1 * | 3/2011 | Shin .......................... F01P 7/12 165/299 |
| 2011/0226541 A1 * | 9/2011 | Hori et al. ...................... 180/68.1 |
| 2013/0081785 A1 * | 4/2013 | Yoo .................................. 165/96 |
| 2013/0126253 A1 | 5/2013 | Saito et al. |
| 2013/0264047 A1 * | 10/2013 | Charnesky ........... B60K 11/085 165/287 |
| 2013/0275009 A1 * | 10/2013 | Sakai ............................... 701/49 |
| 2014/0094104 A1 * | 4/2014 | Manhire .............. B60K 11/085 454/152 |
| 2014/0097366 A1 * | 4/2014 | Klippert et al. ........... 251/129.01 |
| 2014/0130763 A1 * | 5/2014 | Boom .................... F02M 35/10 123/184.21 |

(Continued)

FOREIGN PATENT DOCUMENTS

DE    10 2005 017 160 A1    10/2006
EP         1 557 547 A2    7/2005

(Continued)

*Primary Examiner* — Katy M Ebner
*Assistant Examiner* — Emma K Frick
(74) *Attorney, Agent, or Firm* — Muncy, Geissler, Olds & Lowe P.C.

(57) ABSTRACT

A grille shutter for a vehicle includes a frame, an actuator, a grille flap, and a grille shaft. The actuator includes a casing mounted on the frame, an electric motor received in the casing, an output member having a first end, a second end and a stop projection between the first and second ends, and stop members stationary relative to the casing. The stop members cooperate with the stop projection to limit rotation of the output member. The grille shaft is coupled to the output member and rotatably couples the grille flap to the frame.

10 Claims, 6 Drawing Sheets

(56) References Cited

U.S. PATENT DOCUMENTS

| | | | | |
|---|---|---|---|---|
| 2014/0284123 A1* | 9/2014 | Bourqui | ............... | B60K 11/085 180/68.1 |
| 2014/0342655 A1* | 11/2014 | Boom et al. | ................... | 454/313 |
| 2014/0345400 A1* | 11/2014 | Bourqui | ....................... | 74/89.16 |
| 2015/0136500 A1* | 5/2015 | Boom | .................. | B60K 11/085 180/68.1 |
| 2015/0152774 A1* | 6/2015 | Ritz | ......................... | F01P 1/06 454/155 |
| 2015/0174999 A1* | 6/2015 | Boom | .................. | B60K 11/085 701/49 |
| 2015/0197147 A1* | 7/2015 | Koh | ......................... | H02K 3/28 180/68.1 |

FOREIGN PATENT DOCUMENTS

| | | |
|---|---|---|
| GB | 1410047 A | 10/1975 |
| JP | 2000-88337 A | 3/2000 |

* cited by examiner

GRILLE SHUTTER

CROSS REFERENCE TO RELATED APPLICATIONS

This non-provisional patent application claims priority under 35 U.S.C. §119(a) from Patent Application No. 1317328.1 filed in The United Kingdom on Oct. 1, 2013, the entire contents of which are hereby incorporated by reference.

FIELD OF THE INVENTION

This invention relates to a grille shutter for a vehicle and in particular, to a grille shutter having a limited range of motion.

BACKGROUND OF THE INVENTION

Grilles are widely used in vehicles to allow air to enter for engine cooling. A vehicle grille is typically located at the front of the engine compartment of the vehicle. Grille shutters are used to control air flow through the grilles. Grille shutters can improve the overall fuel efficiency of a vehicle. FIGS. 1 and 2 illustrate a traditional vehicle grille shutter 10 that includes a frame 12 and a plurality of grille flaps 14 rotatably supported by the frame 12. The grille flaps 14 are linked together by a linkage 16 and driven by a input mechanism 18 to rotate between a fully closed position (as shown in FIG. 1) and a fully open position (as shown in FIG. 2). The input mechanism 18 mates with an output of an actuator. When the grille flaps 14 are in partially or fully open position, openings 20 between adjacent flaps 14 allows air to flow there through to cool the radiator and the engine of the vehicle. When the grille flaps 14 are in the fully closed position, the openings 20 are closed and outside air is blocked by the flaps 14 in order to improve fuel efficiency when the vehicle is in motion or at a temperature below a threshold value.

A pair of stop projections 22 are formed on the frame 12. When the flaps 14 rotate to the fully closed position, as shown in FIG. 1, further rotation of the flaps 14 is stopped by contact between adjacent flaps 14. When the flaps 14 rotate to the fully open position, as shown in FIG. 2, further rotation of the flaps 14 is stopped by contact between the stop projections 22 and at least one of the flaps.

In such a vehicle grille shutter arrangement, the stopping system is external to the actuator and the actuator torque stresses the mechanical parts of the grille shutter, including the stop projections, the flap and the linkage. The stresses could deform or even break the grille flaps. To avoid this problem, the mechanical parts are required to be made of a strong material. However, this makes the grille shutter heavier and less cost efficient. In addition, the external stopping system brings spatial constraints to the mechanical parts outside the actuator.

SUMMARY OF THE INVENTION

Hence, there is a desire for an improved grille shutter that can overcome the above described shortcomings. Specifically, it is desirable to have a lighter grille shutter.

Accordingly, in one aspect thereof, the present invention provides a grille shutter, comprising: a frame; an actuator comprising: a casing mounted on the frame; an electric motor disposed in the casing; and an output member driven by the electric motor and having a first end and a second end; a grille flap; and a grille shaft coupled to the output member and rotatably coupling the grille flap to the frame, wherein the actuator has a first member stationary with respect to the casing and the output member has a first projection disposed between the first and second ends and cooperating with the first member to limit rotation of the output member in a first direction.

Preferably, the actuator further comprises a second member stationary with respect to the casing, the second member cooperating with the first projection to limit rotation of the output member in a second direction.

Preferably, the first projection of the output member is circumferentially disposed between the first member and the second member and overlaps with the first member and the second member in a radial direction and an axial direction of the output member.

Alternatively, the output member of the actuator further includes a second projection; and the first member is circumferentially disposed between the first projection and the second projection and overlaps with the first projection and the second projection in a radial direction and an axial direction of the output member.

Preferably, the actuator further comprises a gear train coupling the electric motor to the output member; and the output member comprises a shaft and a plate fixed to the shaft and having a toothed segment engaged with the gear train and a smooth segment.

Preferably, a maximum radius of the toothed segment is greater than a maximum radius of the smooth segment.

Preferably, the first projection extends outwardly from a radially outer surface of the smooth segment.

Preferably, the casing has a substantially rectangular configuration with two long side walls and two short side walls; and the smooth segment is close to and facing one of the two short side walls.

Preferably, the first projection is formed on the output member and the first member is formed on the casing.

According to a second aspect, the present invention provides a vehicle having a grille opening and incorporating a grille shutter as described above, wherein the frame is fixed to the vehicle and the grille shutter is arranged to substantially cover the grille opening.

In embodiments of the present invention, the motion limitation system is arranged inside the actuator and mechanical parts of the grille shutter outside the actuator are not stressed by the stopping system. Therefore, the grille shutter can be made lighter. Furthermore, mechanical parts outside the actuator are not spatially constrained by the stopping system, which makes the design for these parts simpler.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
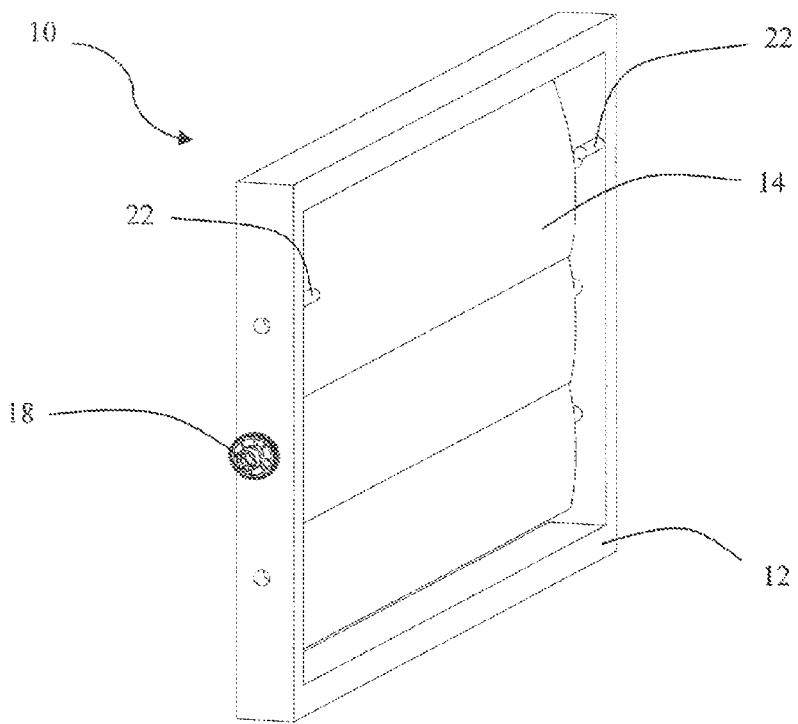
FIG. 1 illustrates a prior art grille shutter in the closed condition.
Figure 2:
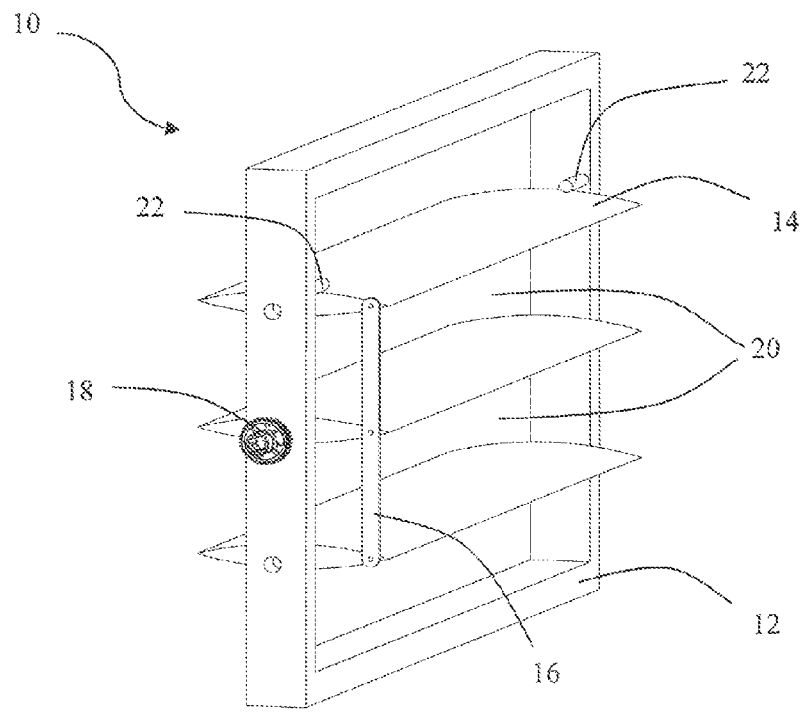
FIG. 2 illustrates the grille shutter of FIG. 1 in the open condition.
Figure 3:
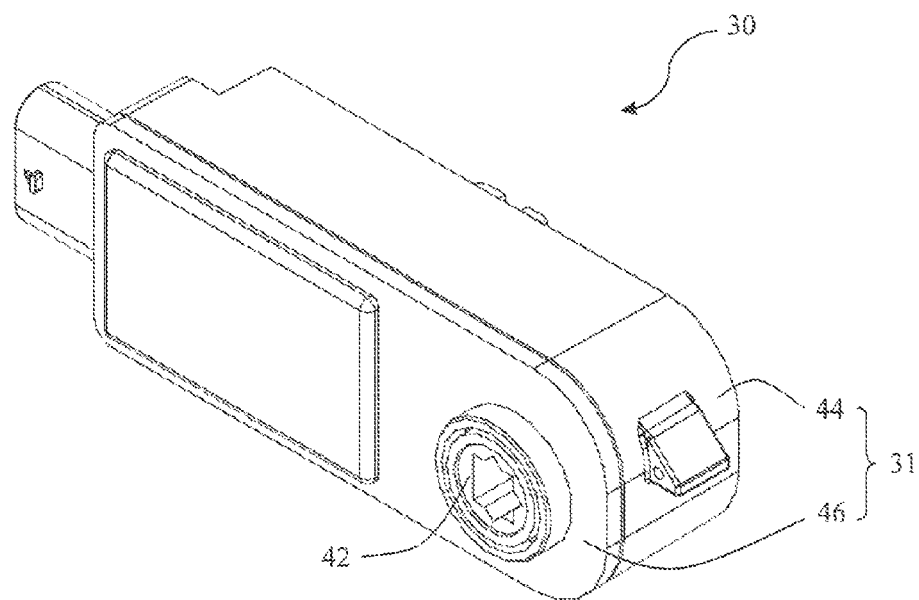
FIG. 3 illustrates an assembled actuator in accordance with an embodiment of the present invention.
Figure 4:
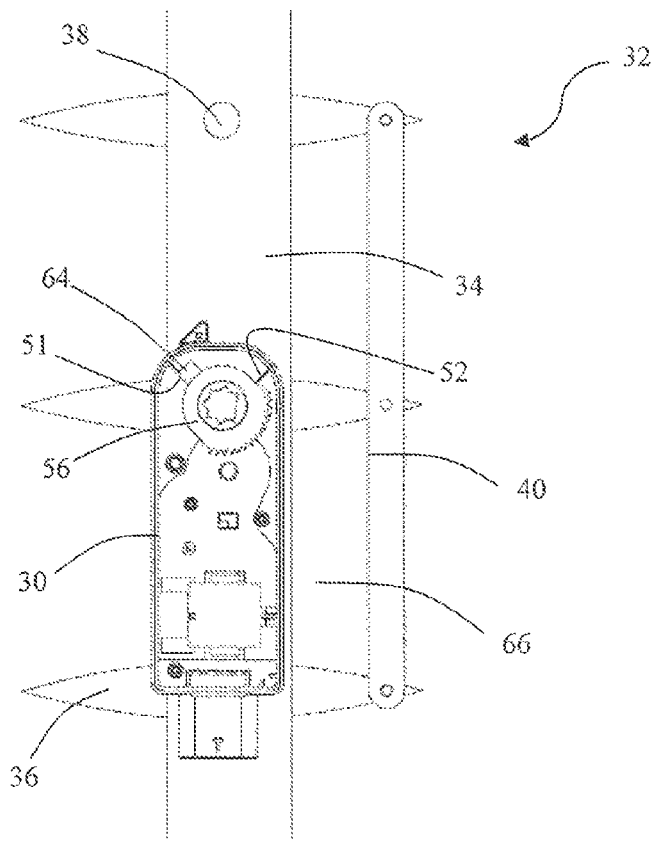
FIG. 4 illustrates a grille shutter in the open condition incorporating the actuator of FIG. 3 with some parts of the actuator removed.
Figure 5:
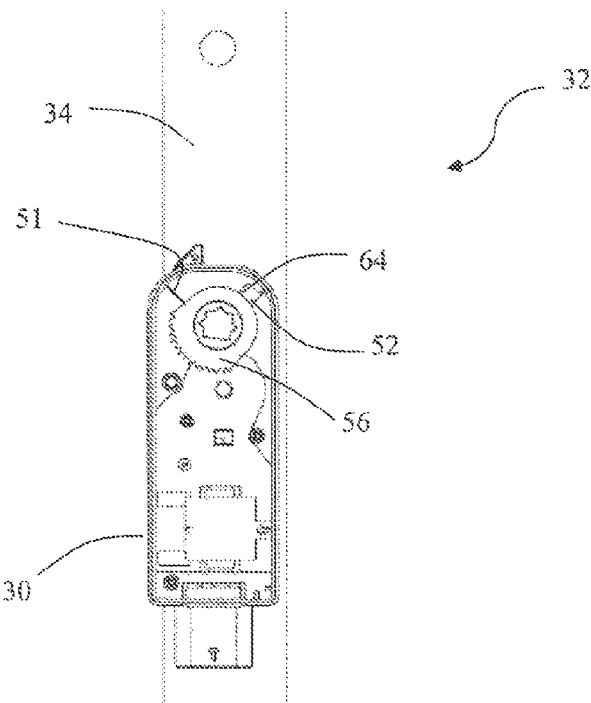
FIG. 5 illustrates the grille shutter and actuator of FIG. 4, in the closed condition.
Figure 6:
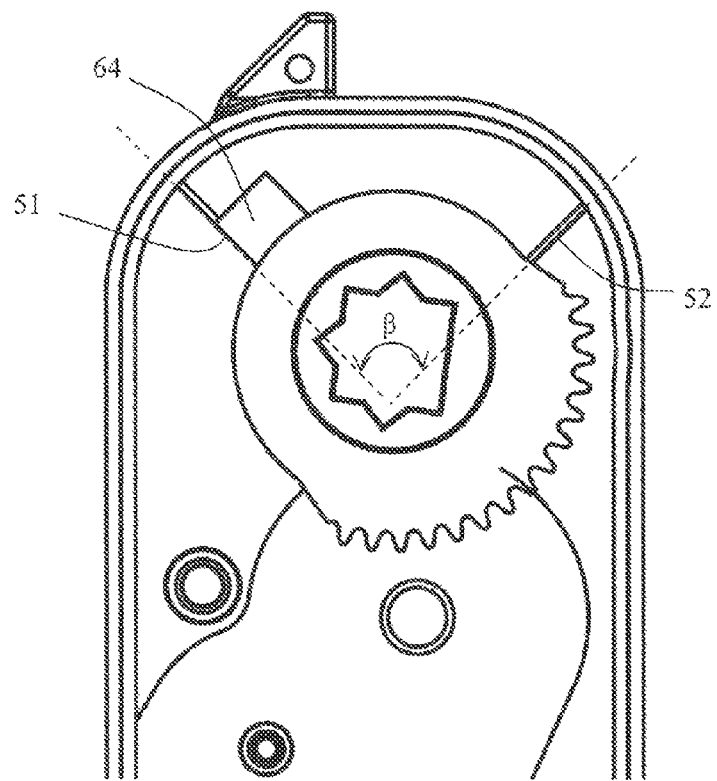
FIG. 6 is a partially enlarged view of the part actuator shown in FIG. 4.

FIG. 3 illustrates an actuator 30 in accordance with a preferred embodiment of the present invention. FIGS. 4 and 5 illustrate a grille shutter 32 for a vehicle incorporating the actuator 30 with some parts of the actuator being removed for clarity of illustration, such as the cover, motor and gear train. FIG. 4 shows the grille shutter 32 in the fully open position and FIG. 5 shows the grille shutter 32 in the fully closed position. FIG. 6 is a partially enlarged view of a part of the actuator 30. The grille shutter 32 includes a frame 34 mountable to a body of the vehicle (not shown in the figures), a plurality of grille flaps 36, and the actuator 30. Each of the flaps 36 has a shaft 38 rotatably supported by the frame 34. The flaps 36 are linked together by a linkage 40. The actuator 30 is coupled to the shaft 38 of one of the flaps 36 so as to bi-directionally rotate the flaps 36 between the fully open position and the fully closed position.

Figure 7:
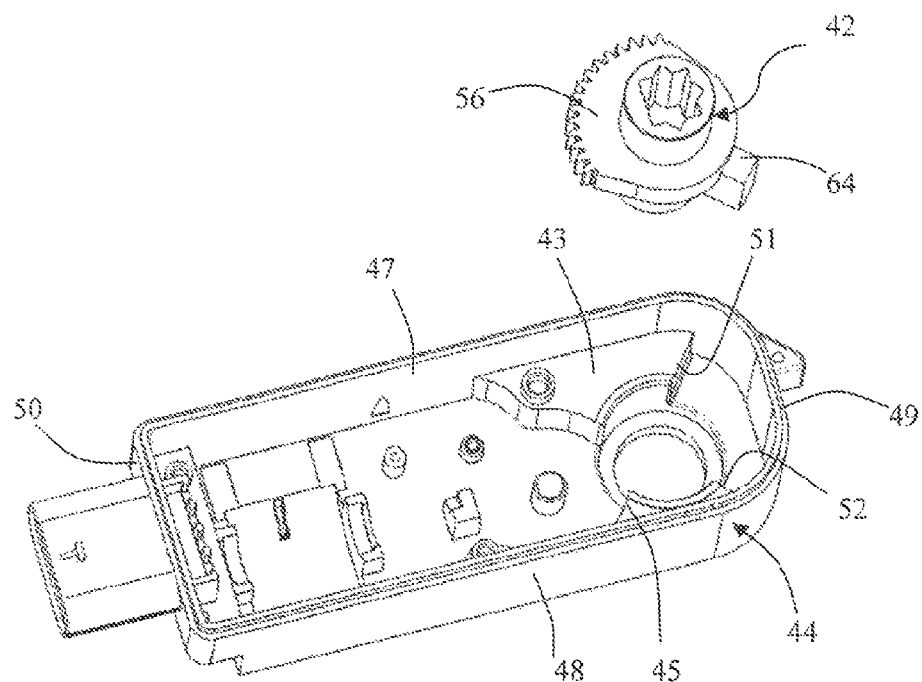
FIG. 7 is a partially exploded view of the part actuator shown in FIG. 4.

FIG. 7 is an exploded view of parts of the actuator 30. The actuator 30 includes a casing 31 (shown in FIG. 3), an electric motor (not shown), an output member 42, and a gear train (not shown) connecting the motor to the to the output member 42. The gear train is a gear reduction transmission used to reduce the rotational speed of the motor. The motor and the gear train are received in the casing 31 and may be any type of motor and gear reduction transmission suitable for operation of the grille shutter 32. The casing 31 comprises a base 44 fixedly mounted to the frame 34 and a cover 46 (shown in FIG. 3) fixed to the base 44. The casing 31 has a substantially rectangular configuration with two long side walls 47, 48 and two short side walls 49, 50. The output member 42 is near one end of the rectangular casing 31 close to the short side wall 49. Two extending parts 43, 45 extend inward from the long side walls 47, 48 so that a pair of stop members 51, 52 are formed adjacent to the short side wall 49. Preferably, the stop members 51, 52 have two planar walls which form an angle β (FIG. 6) with respect to each other. Angle β is typically between 90 and 120 degrees, depending on the application's requirement.

Figure 8:
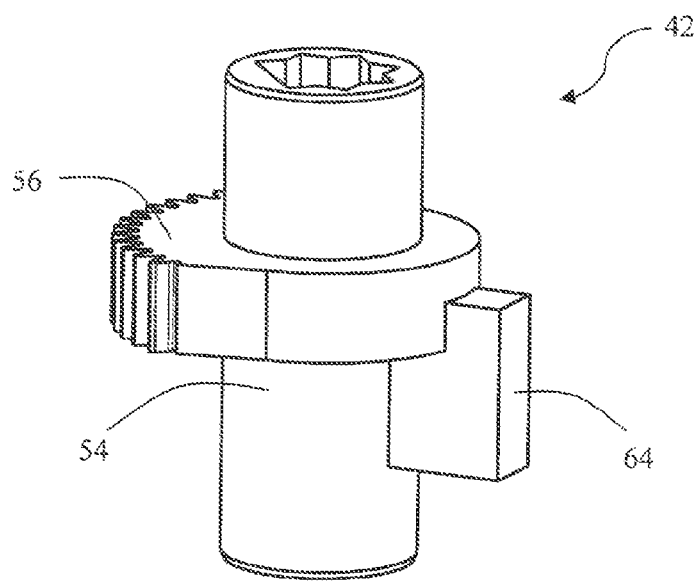
FIG. 8 is a view of an output member being a part of the actuator of FIG. 4.
Figure 9:
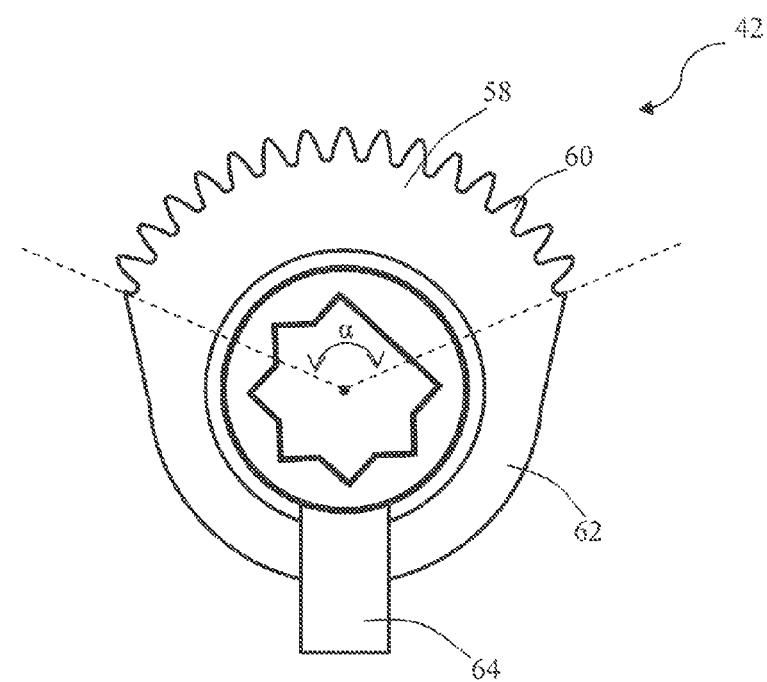
FIG. 9 is a plan view of the output member of FIG. 8.

Also referring to FIGS. 8 and 9, the output member 42 comprises a shaft 54 rotatably supported by the casing 31 at both ends thereof and a plate 56 attached to the shaft 54. The shaft 54 and the plate 56 may be integrally formed as one piece or made up of separate pieces assembled together. The plate 56 has a toothed segment 58 with a plurality of teeth 60 formed on the radially outer surface thereof and a smooth segment 62. In operation, the toothed segment 58 is engaged with a final-stage gear of the gear train. A stop projection 64 extends radially from the smooth segment 62 and the shaft 54 beyond a radially outer surface of the smooth segment 62. In accordance with a specific embodiment of the present invention, the stop projection 64 is arranged near the circumferential center of the smooth segment 62. The stop projection 64 is arranged circumferentially between the stop members 51, 52 of the casing 31 (shown in FIG. 6) and overlapping with the stop members 51, 52 in the radial and axial directions of the shaft 54 so that the range of rotation of the stop projection 64 is confined between the stop members 51, 52. Thus rotation of the output member 42 is limited by the projection 64 contacting member 51 in one direction and member 52 in the other direction. The range of motion of the output member corresponds to the flaps rotating between the open and closed positions.

In accordance with a preferred embodiment, the maximum radius of the toothed segment 58 is greater than the radius of the smooth segment 62. The stop projection 64 is adjacent to and faces the short side wall 49 during operation of the actuator 30. This configuration requires less space for the output member 42 to operate and thereby enabling a compact design for the casing 31.

In accordance with a preferred embodiment, two virtual radial lines from the center of the shaft 54 to the two circumferential tips of the toothed segment 58 form an angle α that is greater than angle β. In accordance with a preferred embodiment, angle α is greater than angle β by the angular width of two or more teeth 60.

In operation, as the shaft 54 rotates, the output member 42 drives the grille flaps 36 and the stop projection 64 moves between the stop members 51, 52. When the stop projection 64 abuts against the stop member 51, further movement of the output member 42 and the counter-clockwise rotation of flaps 36 are stopped and the flaps 36 reach the fully open position. Outside air can be drawn into the vehicle via the openings 66 between flaps 36 with minimum obstruction to cool the radiator and the engine of the vehicle. When the stop projection 64 abuts against the stop member 52, further movement of the output member 42 and the clockwise rotation of the flaps 36 are stopped and the flaps 36 reach a fully closed position so that the openings 66 are closed. Outside air is blocked by the flaps 36. The output member 42 can also stop at an intermediate position when the stop projection 64 is between the stop members 51, 52 so that the flaps 36 are in a partially open position to provide appropriate air flow.

In accordance with the present invention, the motion limitation system for confining the movement of the grille shutters is inside the actuator 30. There is no force applied on the shutters 36, thereby minimizing or substantially eliminating the stress on mechanical parts of the grille shutter 32 outside the actuator 30. Therefore, the mechanical parts in grille shutter 32 can be made of lighter and/or more cost efficient material. Furthermore, there is no external spatial constraint to the motion of the mechanical parts outside the actuator 30, which makes the design for these parts simpler.

In accordance with alternative embodiments of the present invention, the stop projection 64 may alternatively be formed on another suitable rotatable member of the actuator 30 and mechanically coupled to the shaft 54, as long as the abutment between the stop projection 64 and the stop members 52, 52 does not interfere with the operation of the actuator 30.

For example, the stop protrusion 64 may extend from only the shaft 54 or from only the smooth segment 62.

For example, the stop protrusion 64 may be axially aligned with or higher than the axial end surface of the plate 56 facing the cover 46.

Figure 10:
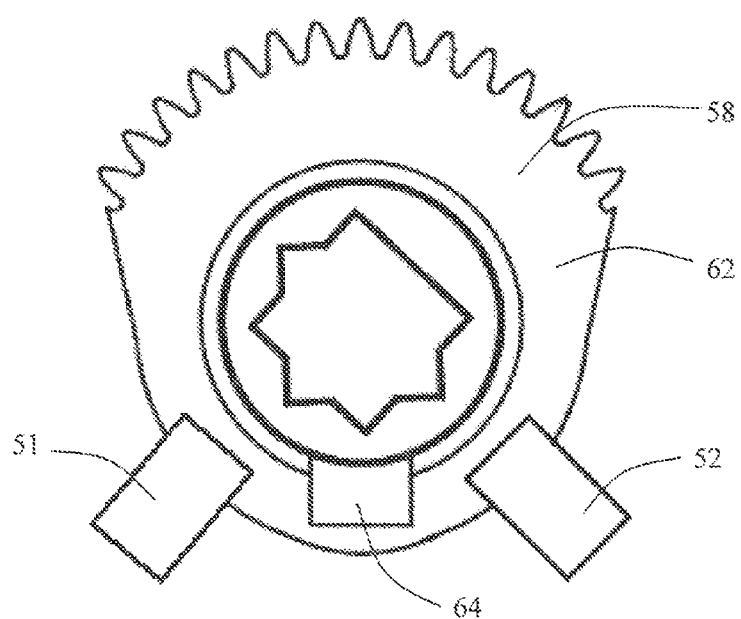
FIG. 10 is a schematic view of a motion limitation system of a grille shutter in accordance with an embodiment of the present invention.

For example, in another embodiment as shown in FIG. 10, the stop projection 64 is formed on an axial end (top or bottom) surface of the plate 56 and the stop members 51, 52 are formed on the surface of the casing 31 facing the top or bottom surface. In this embodiment, the plate 56 may be the same as the above described plate 56 and the stop projection 64 may be formed on the smooth segment 62 as shown in FIG. 10. Stop projection 64 may also be formed on the toothed segment 58. The plate 56 may alternatively be a toothed wheel with teeth arranged on the entire circumference thereof.

Figure 11:
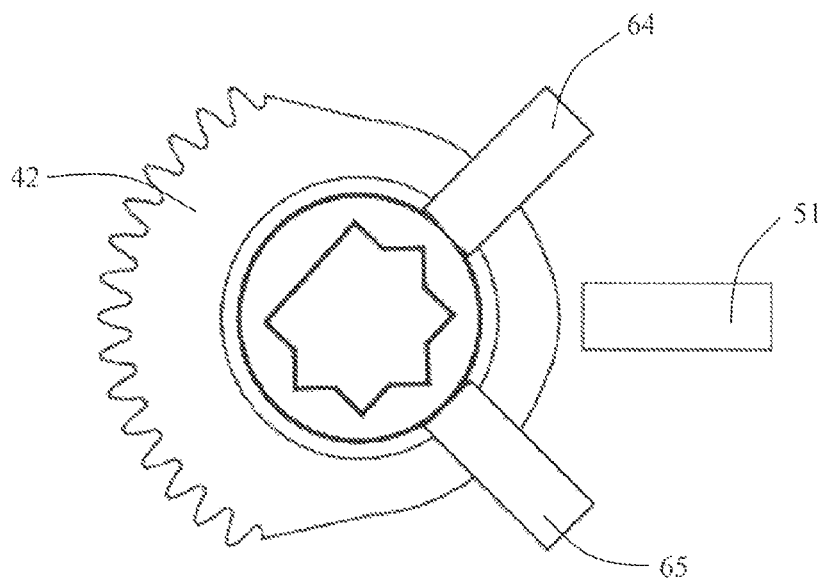
FIG. 11 is a schematic view of a motion limitation system of a grille shutter in accordance with another embodiment of the present invention.

In a third embodiment, as shown in FIG. 11, a pair of stop projections 64, 65 are formed on the output member 42 and a single stop member 51 is correspondingly formed on the casing 31. The stop member 51 is arranged circumferentially between the two stopping projections 64, 65 and overlapping with the stop projections 64, 65 in radial and axial directions.

In accordance with yet another embodiment, the actuator 30 has a single stop member 51. When the stop projection 64 abuts against the stop member 51, further movement of the output member 42 and the counter-clockwise rotation of the flaps 36 are stopped and the flaps 36 reach a fully open position. When the flaps 36 reversely rotate and reach the fully closed position, further rotation of the flaps 36 are stopped by direct contact between adjacent flaps 36.

It should be understood that the stop members may be formed by other suitable structures which could stop rotation of the output member 42 by contacting the stop projection.

Figure 12:
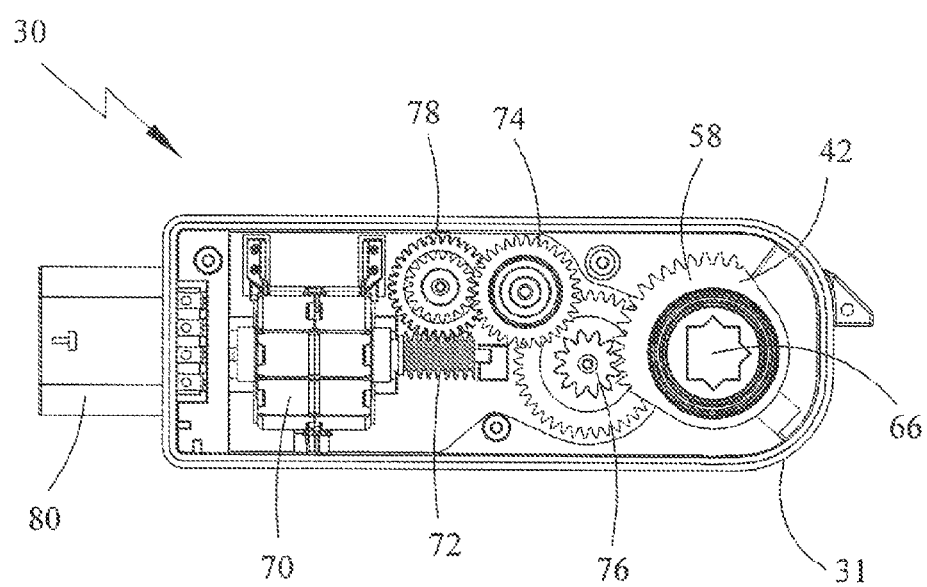
FIG. 12 is a plan view of the actuator of FIG. 3 with the cover removed.

FIG. 12 illustrates the actuator 30 of FIG. 3 with the cover removed to show the motor 70 and the gear train 74 coupling the motor to the output member 42 inside the casing 31. The motor has a worm 72 fitted to the shaft of the motor which is in mesh with a worm gear being the first gear of the gear train 74. The final stage gear 76 is in mesh with and drives the tooth segment 56 of the output member 42. The output member has a shaped through hole 66 for receiving the shaft or input member of the flap. A connector 80 is formed on the casing to provide an electrical connection for the motor.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined by the appended claims.

The invention claimed is:

1. A grille shutter, comprising:
a frame;
an actuator comprising:
  a casing mounted on the frame;
  two extending parts, each extending from one of two long sidewalls of the casing toward each other without touching;
  an electric motor disposed in the casing; and
  an output member driven by the electric motor and having a first end and a second end;
a grille flap; and
a grille shaft coupled to the output member and rotatably coupling the grille flap to the frame,
wherein the actuator has a first member which is a part of one of the extending parts and stationary with respect to the casing and the output member has a first projection disposed between the first and second ends and cooperating with the first member to limit rotation of the output member in a first direction;
wherein the second end of the output member extends through the casing and the frame and is coupled to the grille shaft.

2. The grille shutter of claim 1, wherein the actuator further comprises a second member which is a part of another one of the extending parts and stationary with respect to the casing, the second member cooperating with the first projection to limit rotation of the output member in a second direction.

3. The grille shutter of claim 2, wherein the first projection of the output member is circumferentially disposed between the first member and the second member and overlaps with the first member and the second member in a radial direction and an axial direction of the output member.

4. The grille shutter of claim 2, wherein the first projection is formed on the output member and the first and second members are formed on the casing.

5. The grille shutter of claim 1, wherein the actuator further comprises a gear train coupling the electric motor to the output member; and the output member comprises a shaft and a plate fixed to the shaft, the plate having a toothed segment engaged with the gear train and a smooth segment.

6. The grille shutter of claim 5, wherein a maximum radius of the toothed segment is greater than a maximum radius of the smooth segment.

7. The grille shutter of claim 6, wherein the first projection extends outwardly from a radially outer surface of the smooth segment.

8. The grille shutter of claim 7, wherein the casing has a substantially rectangular configuration with said two long side walls and two short side walls; and the smooth segment is close to and facing one of the two short side walls.

9. The grille shutter of claim 1, wherein the first projection is formed on the output member and the first member is formed on the casing.

10. A vehicle having a grille opening and incorporating the grille shutter of claim 1, wherein the frame is fixed to the vehicle and the grille shutter is arranged to substantially cover the grille opening.

* * * * *